Jan. 25, 1955 K. E. KOEFOED 2,700,569
REFRIGERATED DELIVERY TRUCK BODY DOOR ARRANGEMENT
Filed Sept. 30, 1952 2 Sheets-Sheet 1

INVENTOR.
Karl Koefoed
BY
A. Schapp
ATTORNEY

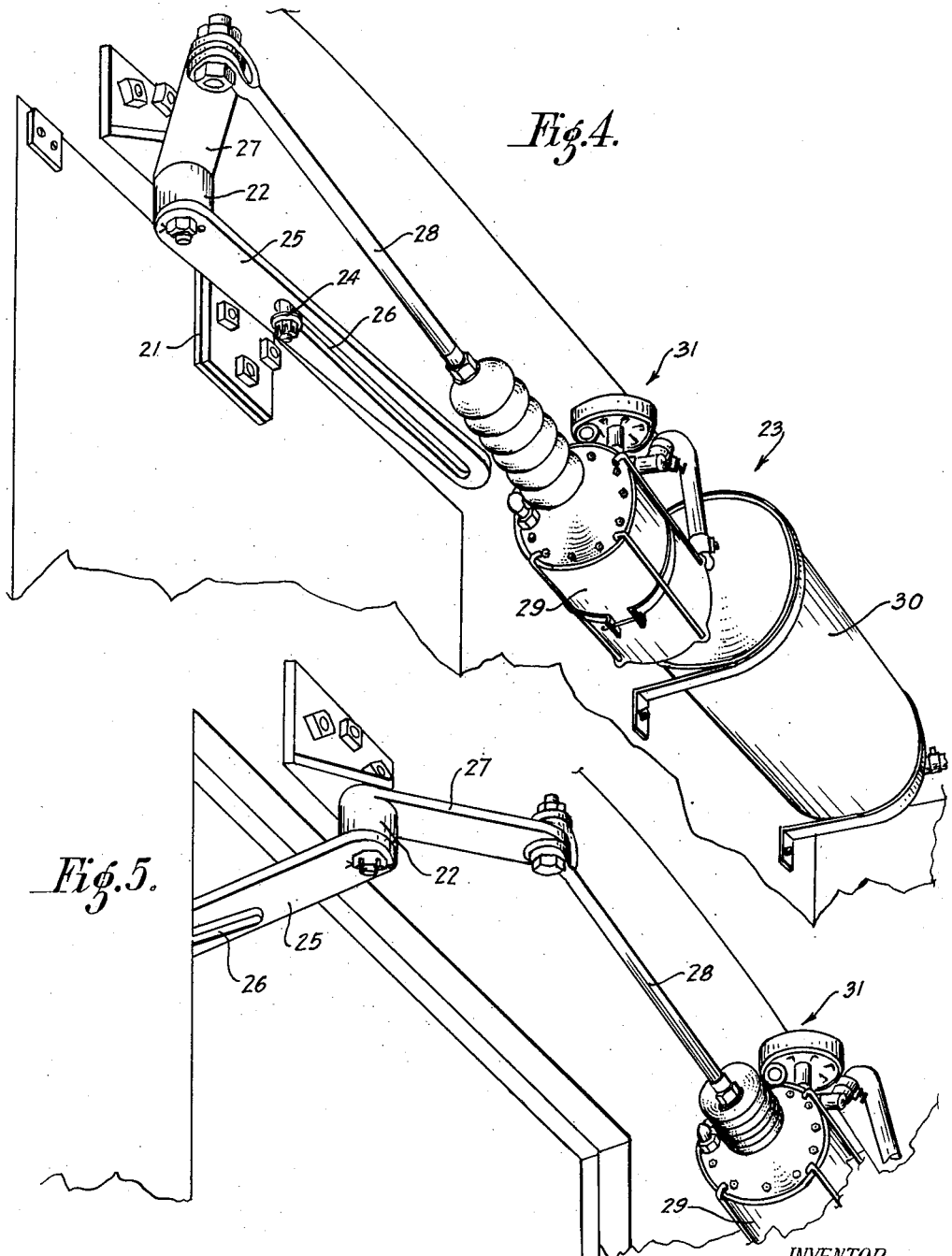

United States Patent Office 2,700,569
Patented Jan. 25, 1955

2,700,569

REFRIGERATED DELIVERY TRUCK BODY DOOR ARRANGEMENT

Karl E. Koefoed, San Francisco, Calif.

Application September 30, 1952, Serial No. 312,242

6 Claims. (Cl. 296—24)

The present invention relates to improvements in refrigerated truck bodies, and has particular references to retail milk delivery trucks.

The principal object of the invention is to provide a truck body of the character described in which the cases containing the milk bottles or cartons can be stored under perfectly sanitary conditions, and under perfect temperature control, while at the same time, means are provided for giving the driver or operator convenient access to the cases with a minimum loss of refrigerated air.

More particularly it is proposed to provide a bulkhead dividing the truck body into two compartments, one of which serves as a storage compartment, while the other forms the driver's cab.

It is further proposed in my invention, to provide a door opening in this bulkhead with a door adapted for easy opening and closing, so that the driver may have easy and immediate access to the storage compartment from his driver's cab.

Another object of the invention is to provide control means for the door whereby the latter is readily opened and closed by the mere operation of one or more switches provided in the cab.

It is additionally proposed in the present invention to provide a pit in the storage compartment immediately adjacent the door, the bottom of the pit being sufficiently spaced from the roof of the body to allow a person to stand upright therein for ready access to and handling of containers stored in cases in the storage compartment.

Further objects and advantages of my invention will appear as the specification proceeds, and the new and novel features of my refrigerated truck body will be fully defined in the claims attached thereto.

Figure 1:
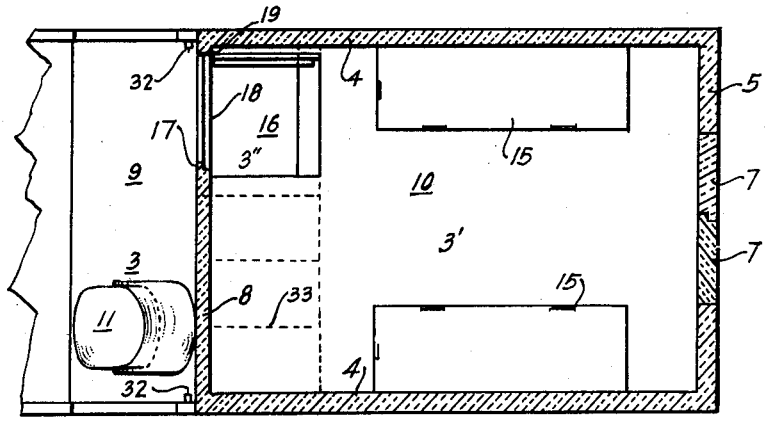
Figure 2:
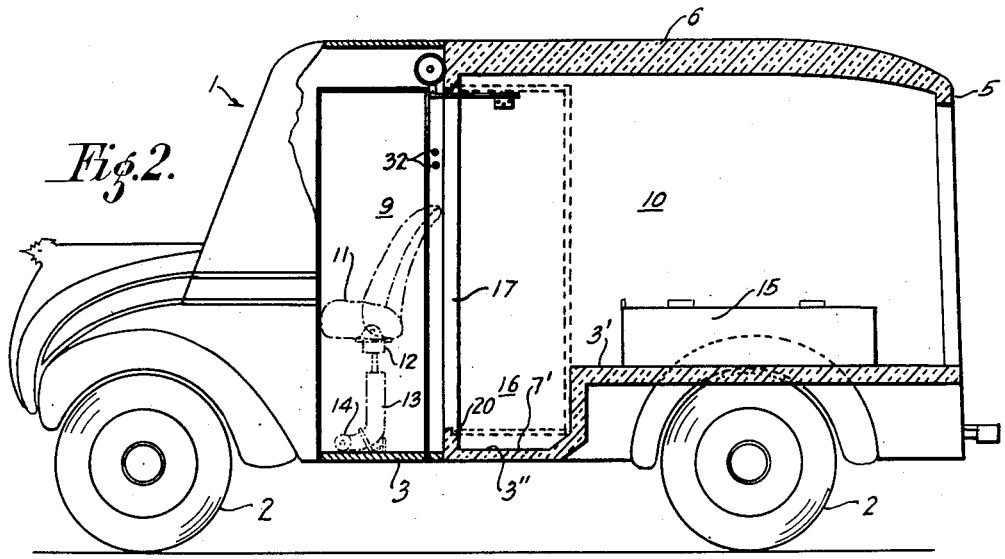
Figure 3:
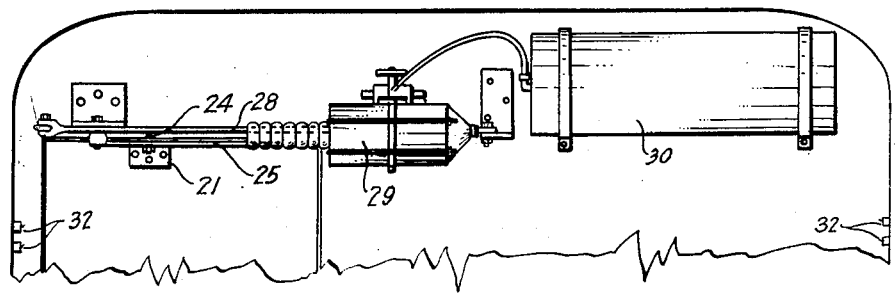

The preferred form of my invention is illustrated in the accompanying drawings forming part of this application, in which:

Figure 1 shows a fragmentary horizontal section through a portion of my truck body;

Figure 2, a side view of a truck having the features of my invention incorporated therein, portions being shown in section;

Figure 3, a front view of a bulkhead used in my invention;

Figure 4, a perspective view of a door-operating mechanism, showing the door in closed position; and Figure 5, a similar view, showing the door in open position.

While I have shown only the preferred form of my invention, it should be understood that various changes or modifications may be made within the scope of the claims attached hereto, without departing from the spirit of the invention.

Referring to the drawing in detail, the truck body 1 is supported on four wheels 2, in a conventional manner, and may be propelled by any suitable power means.

The truck body is generally rectangular in form, and presents in its general features, a floor 3, side walls 4 rising from the side edges thereof, a rear wall 5, and a roof structure 6 supported on said walls. The rear wall may be equipped with a pair of swinging doors 7.

A bulkhead 8 extends transversely across the body, substantially in spaced and parallel relation to the rear wall, and separates the body into two compartments 9 and 10, the former serving as a driver's compartment, and the latter generally as a storage compartment.

The driver's compartment is provided with the conventional seat 11 mounted behind the steering wheel (not shown) and usually located on the left side of the compartment. I preferably use a seat of known construction, in which the seat and back are pivoted, as at 12, for forward swinging movement, and in which the leg 13 again is pivoted, as at 14, whereby the entire seat may be swung out of the way to leave a clear aisle in front of the bulkhead.

The storage compartment, which is much larger than the driver's cab, is arranged conveniently to accommodate a large number of rectangular cases in stacked and alined order.

The floor of the front compartment is relatively low and may be substantially on a level with the axes of the wheels. This makes it easy for the driver to step in and out.

The floor in the storage compartment is considerably higher, as indicated by 3', and may be substantially on a level with the upper rims of the wheels, as shown in Figure 2. Over the wheels, wheel boxes 15 are provided, and these wheel boxes are of a width substantially commensurate with the length of the milk cases to be stored, while the space in between is approximately twice the width, so that two cases may be placed against one another endwise in this space. The cases may be stacked four high on the floor, and three high on the wheel spaces.

Adjacent the bulkhead, which, except for the door opening hereinafter mentioned, forms a complete closure for the storage compartment, is provided a pit 16, the floor 3" of which is substantially on a level with the floor in the front compartment, except for the insulating layer 7', and is spaced from the roof of the truck body sufficiently to allow a person to stand erect in the pit for easy and convenient access to the milk containers in the storage compartment.

While the driver's seat has been described as being disposed in the left portion of the driver's cab, the pit is preferably located adjacent the right wall, as shown in Figure 1.

Adjacent the pit, the bulkhead 8 is formed with a door opening 17 adapted to be closed by means of a door 18 swingably mounted on hinges 19, and free to swing from the door opening toward the right side wall 4. The lower portion of the door swings in the pit, but the bulkhead is formed with a sill 20 underneath the door to provide a barrier for refrigerated air which might tend to escape along the bottom of the pit floor when the door is opened.

The relative position of the driver's seat, the pit and the door make it possible for the driver to reach the pit very simply by turning on the seat and stepping through the opened door into the pit for access to the storage compartment.

The door is preferably operated by the mechanism illustrated in detail in Figures 3, 4 and 5, and comprising in its principal features, a bracket 21 secured upon the door near the upper edge thereof and a bell crank lever 22 pivoted to the bulkhead immediately above the door opening, and suction means 23 operating the bell crank lever.

The bracket 21 serves as supporting means, for a downwardly projecting pin 24, and the bell crank lever has an arm 25 swingable into the door opening, and slotted, as at 26, to receive the pin 24. The other arm 27 of the bell crank lever is operated by a connecting rod 28 at the end of a piston (not shown) slidable in a cylinder 29 and operated by suction from the tank 30 through a valve mechanism generally indicated at 31, which is adapted to divert the suction to one end of the cylinder 29, or the other for effecting door opening and closing movements.

The valve is preferably of the magnetic type and operated by an electrical circuit including switches 32 disposed in opposite side walls of the cab, so as to be readily available for immediate control by the driver.

Thus the driver may readily open or close the door 18 by pressing one switch or the other, at either side of the cab.

In operation, the driver upon coming to a stop, may open the door by pressing on the proper switch, then turn around on his seat and step into the pit, where he can stand erect and reach the major portion of the cases before him.

Immediately upon grasping the desired milk containers, he will step through the door opening, press another of the switches 32 with his finger, or with an elbow if both hands are filled, for closing the door, whereupon he may step outside the cab for delivery of the milk.

In a number of trucks built by me in accordance with the present invention, the storage compartment is arranged in such a manner that an operator standing in the pit 16 has about two-thirds of the entire load within reaching distance, so that it requires a minimum amount of re-arranging to render all the cases available for taking out the full bottles and replacing the empty bottles.

The truck may be refrigerated in any suitable manner, and all the walls of the storage compartment should be suitably insulated.

A cabinet 33 may be placed in the storage compartment adjacent the bulkhead for holding various other dairy products, such as cheese, butter and cream usually sold with milk.

While the features of my invention have been particularly described in connection with a refrigerated truck, it is apparent that they may be incorporated in any other delivery truck.

I claim:

1. A refrigerated truck body comprising a floor, spaced side walls and a rear wall rising from the floor and a roof resting on the walls, a bulkhead extending transversely across the body and dividing the same into a driver's compartment and a storage compartment, and a driver's seat in the driver's compartment adjacent one of the side walls, the floor of the storage compartment being generally higher than that of the driver's compartment and having a pit adjacent the bulkhead and the other side wall, the bulkhead having a door opening adjacent the pit and having a door for the opening swingable over the pit and toward the second wall and into a position adjacent thereto, and the pit having a floor substantially on a level with the floor of the driver's compartment and spaced from the roof of the body to allow a truck driver to stand upright therein for convenient access to cases stored in the storage compartment.

2. A refrigerated truck body comprising a floor, spaced side walls and a rear wall rising from the floor and a roof resting on the walls, a bulkhead extending transversely across the body and dividing the same into a driver's compartment and a storage compartment, and a driver's seat in the driver's compartment adjacent one of the side walls, the floor of the storage compartment being generally higher than that of the driver's compartment and having a pit adjacent the bulkhead and the other side wall, the bulkhead having a door opening adjacent the pit and having a door for the opening swingable over the pit and toward the second wall and into a position adjacent thereto, and the pit having a floor substantially on a level with the floor of the driver's compartment and spaced from the roof of the body to allow a truck driver to stand upright therein for convenient access to cases stored in the storage compartment, and the bulkhead having a raised sill for the door opening to form a barrier for refrigerated air when the door is opened.

3. A refrigerated truck body comprising a floor, spaced side walls and a rear wall rising from the floor and a roof resting on the walls, a bulkhead extending transversely across the body and dividing the same into a driver's compartment and a storage compartment, and a driver's seat in the driver's compartment adjacent one of the side walls, the floor of the storage compartment being generally higher than that of the driver's compartment and having a pit adjacent the bulkhead and the other side wall, the bulkhead having a door opening adjacent the pit and having a door for the opening swingable over the pit and toward the second wall and into a position adjacent thereto, and the pit having a floor substantially on a level with the floor of the driver's compartment and spaced from the roof of the body to allow a truck driver to stand upright therein for convenient access to cases stored in the storage compartment, and the door having power-operated means controllable from within the driver's compartment for opening and closing the same.

4. A refrigerated truck body comprising a floor, spaced side walls and a rear wall rising from the floor and a roof resting on the walls, a bulkhead extending transversely across the body and dividing the same into a driver's compartment and a storage compartment, and a driver's seat in the driver's compartment adjacent one of the side walls, the floor of the storage compartment being generally higher than that of the driver's compartment and having a pit adjacent the bulkhead and the other side wall, the bulkhead having a door opening adjacent the pit and having a door for the opening swingable over the pit and toward the second wall, and the pit having a floor substantially on a level with the floor of the driver's compartment and spaced from the roof of the body to allow a truck driver to stand upright therein for convenient access to cases stored in the storage compartment, a bracket fixed upon the door and having a vertical pin, a bell crank lever fixed to the bulkhead immediately above the door opening and having one arm swingable within the door opening, with a slot in the arm engaging over the pin, and power means operative on the other arm for swinging the first arm for door opening and closing movements.

5. A refrigerated truck body comprising a floor, spaced side wall and a rear wall rising from the floor and a roof resting on the walls, a bulkhead extending transversely across the body and dividing the same into a driver's compartment and a storage compartment, and a driver's seat in the driver's compartment adjacent one of the side walls, the floor of the storage compartment being generally higher than that of the driver's compartment and having a pit adjacent the bulkhead and the other side wall, the bulkhead having a door opening adjacent the pit and a door for the opening swingable over the pit and toward the second wall, and the pit having a floor substantially on a level with the floor of the driver's compartment and spaced from the roof of the body to allow a truck driver to stand upright therein for convenient access to cases stored in the storage compartment, a bracket fixed upon the door and having a vertical pin, a bell crank lever fixed to the bulkhead immediately above the door opening and having one arm swingable within the door opening, with a slot in the arm engaging over the pin, and power means operative on the other arm for swinging the first arm for door opening and closing movements, the power means including a magnetic control valve, an electric circuit for the same, and switches in the circuit disposed within the driver's compartment.

6. A refrigerated truck body comprising a floor, spaced side wall and a rear wall rising from the floor and a roof resting on the said walls, a bulkhead extending transversely across the body and dividing the same into a driver's compartment and a storage compartment, the floor of the storage compartment being generally higher than that of the driver's compartment and having a pit adjacent the bulkhead, the bulkhead having a door opening adjacent the pit and having a door for the opening and swingable over the pit, and the pit having a floor on a level with the floor of the driver's compartment and substantially lower than the floor of the storage compartment and spaced from the roof to allow the truck driver to stand upright therein for convenient access to cases stored in the storage compartment.

References Cited in the file of this patent

UNITED STATES PATENTS

| Number | Name | Date |
|---|---|---|
| 733,176 | Evans | July 7, 1903 |
| 2,098,357 | Piroumoff | Nov. 9, 1937 |
| 2,125,205 | Snowden | July 26, 1938 |
| 2,194,782 | Baade | Mar. 26, 1940 |
| 2,574,585 | Nielsen | Nov. 13, 1951 |